(12) United States Patent
Nishi

(10) Patent No.: US 9,231,803 B2
(45) Date of Patent: Jan. 5, 2016

(54) DATA RECEIVER, DATA COMMUNICATION SYSTEM, AND DATA COMMUNICATION METHOD

(71) Applicant: Ryohsuke Nishi, Kanagawa (JP)

(72) Inventor: Ryohsuke Nishi, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 336 days.

(21) Appl. No.: 13/893,575

(22) Filed: May 14, 2013

(65) Prior Publication Data
US 2013/0301695 A1 Nov. 14, 2013

(30) Foreign Application Priority Data

May 14, 2012 (JP) .................................. 2012-110860
Mar. 14, 2013 (JP) .................................. 2013-051442

(51) Int. Cl.
*H03K 9/00* (2006.01)
*H04L 27/00* (2006.01)
*H04L 27/01* (2006.01)

(52) U.S. Cl.
CPC ...................................... *H04L 27/01* (2013.01)

(58) Field of Classification Search
CPC ......................... H04L 25/03885; H04L 27/01
USPC ................... 375/224, 229–234, 316
See application file for complete search history.

(56) References Cited

U.S. PATENT DOCUMENTS

| 7,684,531 | B2 | 3/2010 | Masui et al. | |
| 7,787,536 | B2 * | 8/2010 | Chou | 375/232 |
| 8,238,413 | B2 * | 8/2012 | Roethig et al. | 375/232 |
| 8,837,626 | B2 * | 9/2014 | Malipatil et al. | 375/285 |
| 8,902,963 | B2 * | 12/2014 | Aziz et al. | 375/233 |
| 2008/0247452 | A1 * | 10/2008 | Lee | 375/232 |
| 2009/0232196 | A1 | 9/2009 | Sunaga et al. | |
| 2012/0099688 | A1 | 4/2012 | Nishi | |
| 2013/0070835 | A1 * | 3/2013 | Sindalovsky et al. | 375/238 |

FOREIGN PATENT DOCUMENTS

| JP | 2005-192192 | 7/2005 |
| JP | 2009-225018 | 10/2009 |
| JP | 4413664 | 11/2009 |
| JP | 2011-087236 | 4/2011 |

* cited by examiner

*Primary Examiner* — Freshteh N Aghdam
(74) *Attorney, Agent, or Firm* — Oblon, McClelland, Maier & Neustadt, L.L.P.

(57) ABSTRACT

A data receiver is disclosed, including an equalization process part, a multi-value oversampling part, and an equalization controller. The equalization process part equalizes serial received data before binarization and outputs the serial received data being equalized. The multi-value oversampling part binarizes the serial received data being equalized by multiple threshold values, conducts oversampling, and generates the multi-value sampling data. The equalization controller detects an eye pattern of the serial received data being equalized based on the multi-value oversampling data, and controls an equalization characteristic of the equalization process part based on a detection result.

8 Claims, 9 Drawing Sheets

_US 9,231,803 B2_

DATA RECEIVER, DATA COMMUNICATION SYSTEM, AND DATA COMMUNICATION METHOD

BACKGROUND OF THE INVENTION

1. Field of the Invention

The present invention is related to a data receiver and data communication system.

2. Description of the Related Art

In order to satisfy demands of a large capacity and high speed data transmission, numerous high speed interface standards exist in practical use. The high speed interface standards mostly apply to a serial transmission method. In a serial transmission, data are transmitted based on a frequency defined beforehand. A clock signal of a frequency is superimposed with the data to be transmitted. A data receiver extracts the clock signal, and recovers the data based on the clock signal. A circuit for conducting a restore operation is called a "clock data recovery" (hereinafter, abbreviated as a "CDR").

In a conventional CDR circuit, a PLL (Phase-Locked Loop) circuit is generally used. The PLL circuit is controlled so that an oscillator clock of a VCO (Voltage-Controlled Oscillator) in the PLL circuit synchronizes with a phase of received data. The oscillator clock is extracted as a recovery clock. By latching the received data in which the recovery clock is determined as a reference, the received data are accurately recovered.

An oversampling type CDR circuit is proposed (refer to Patent Document 1), for example). The oversampling type CDR circuit generates multiphase clocks in which phases are shifted at equal intervals based on a reference clock. The oversampling data are acquired by sampling input data. The oversampling type CDR circuit detects timing at which a logic is reversed from a bit sequence of the oversampling data, and restores the clock and the data based on the result. By adopting this configuration, since a circuit other than the multiphase clock generator can be configured by using a digital circuit, the circuit can be realized relatively easily.

As a jitter caused by the transmission channel, Inter-Symbol Interference (ISI) is known. Conventionally, an equalizer is used to reduce ISI. In the equalizer, by realizing a filter having a reverse characteristic of the frequency characteristic which causes ISI, the frequency characteristic of the data transmission in a data band is formed to be flat. For instance, the reverse characteristic may be a high pass characteristic in a case in which the frequency characteristic of the transmission channel is the low pass characteristic. By this configuration, the jitter caused by ISI is reduced.

Recently, in order to respond to diversity of a data transmission rate and diversity of the data transmission channel, an adaptive equalizing technology has been developed to adaptively adjust an equalizing amount. Especially, a Decision Feedback Equalizer (DFE) is largely used as the adaptive equalizer in a receiving circuit of a serial transmission system (see Patent Documents 2 and 3).

Moreover, a signal processing apparatus, in which the oversampling type CDR circuit and the adaptive equalizing technology are combined, is known. That is, Patent Document 4 discloses an equalizing processing apparatus of the oversampling type CDR circuit in which its object is to reduce the jitter caused by ISI. Accordingly to the equalizing processing apparatus, received data are binalized, a digital signal process is conducted to binalize the data, and the binalized data are further binalized based on a result of the digital signal process, so as to realize an adaptive equalizing.

Patent Documents

Patent Document 1: Japanese Laid-Open Patent Application No. 2005-192192
Patent Document 2: Japanese Laid-Open Patent Application No. 2011-87236
Patent Document 3: Japanese Laid-Open Patent Application No. 2009-225018
Patent Document 4: Japanese Patent No. 4413664

SUMMARY OF THE INVENTION

The present invention solves or reduces one or more of the above problems.

In one aspect of this disclosure, there is provided a data receiver, including an equalization process part configured to equalize serial received data before binarization and to output the serial received data being equalized; a multi-value oversampling part configured to binarize the serial received data being equalized by multiple threshold values, to conduct oversampling, and to generate the multi-value sampling data; and an equalization controller configured to detect an eye pattern of the serial received data being equalized based on the multi-value oversampling data, and to control an equalization characteristic of the equalization process part based on a detection result.

BRIEF DESCRIPTION OF THE DRAWINGS

In the following, embodiments of the present invention will be described with reference to the accompanying drawings.

DESCRIPTION OF THE PREFERRED EMBODIMENTS

In the following, an embodiment according to the present invention will be described with reference to the accompanying drawings.

An equalizing processing apparatus described in Patent Document 4 can reduce the jitter caused by ISI included in the binalized data. However, the jitter caused by ISI before the binalization cannot be reduced.

Thus, when a significant ISI is caused such that data bits are lost, a jitter reduction ability is immediately lost. By speeding up a data transmission rate, the data bits are frequently lost before binarization. Hence, the jitter reduction ability of the equalizing processing apparatus describe in Patent Document 4 is not sufficient.

Consequently, as the adaptive equalizing technology to combine with an oversampling type CDR circuit, the Decision Feedback Equalizer is considered to be used. However, it is difficult to conduct adaptive equalizing for the received data before binarization only by simply combining the oversampling type CDR circuit with the Decision Feedback Equalizer.

In the Decision Feedback Equalizer, the equalizing process is conducted for the received data before binarization by using a CDR clock. On the contrary, in the oversampling type CDR circuit, the CDR clock is restored by a digital circuit after binarization. Thus, it is difficult to recover the CDR clock at a stage of a signal process circuit before binarization.

In the following embodiments, a data receiver including the oversampling type CDR circuit will be described in which an adaptive equalizing can be realized with respect to serial received data before binarizaion.

First Embodiment

Brief Configuration of Data Communication System

Figure 1:
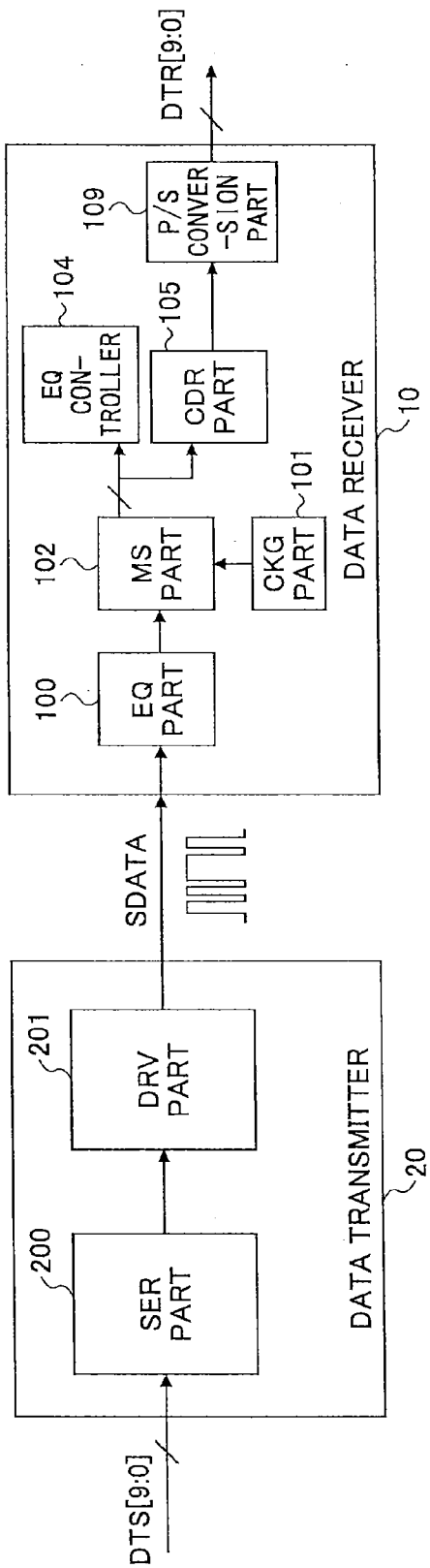
FIG. 1 is a block diagram briefly illustrating a data communication system according to a first embodiment.

FIG. 1 is a block diagram briefly illustrating a data communication system according to a first embodiment.

The data communication system includes a data transmitter 20, and a data receiver 10. The data transmitter 20 includes a serializer (SER) part 200, and an output driver (DRV) part 201. The data receiver 10 includes an equalizer (EQ) part 100, a multiphase clock generator (CKG) part 101, a multi-value oversampling (MS) part 102, an equalizer controller (EQC) 104, a Clock Data Recovery (CDR) part 105, a parallel serial (P/S) conversion part 109.

The serializer (SER) part 200 in the data transmitter 20 inputs parallel data DTS of 10 bits and outputs serial data. A bit number of the parallel data is not limited to 10 bits. The output driver (DRV) part 201 inputs serial data generated by the serializer (SER) part 200, generates waveforms in conformity to an output waveform specification such as an output amplitude, an output impedance, and the like.

The EQ part 100, the CKG part 101, the MS part 102, the EQC 104, and the CDR part 105 in the data receiver 10 will be described later with reference to FIG. 2. The P/S conversion part 109 inputs the serial data from the CDR part 105, converts the serial data into parallel data DTR, and outputs the parallel data DTR.

<<Configuration of Data Receiver>>

Figure 2:
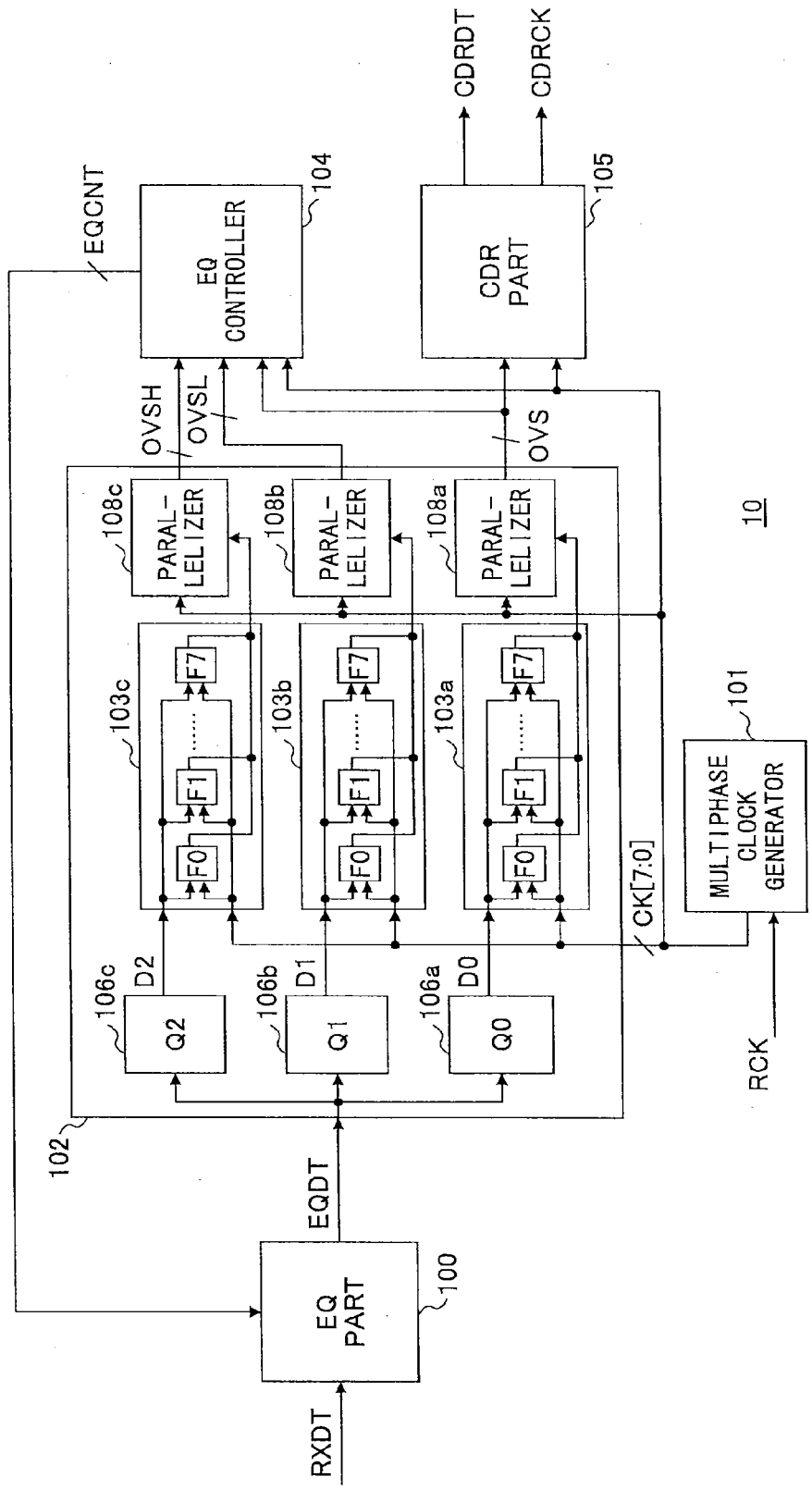
FIG. 2 is a block diagram illustrating a configuration of a data receiver in FIG. 1.

FIG. 2 is a block diagram illustrating a configuration of the data receiver 10 in FIG. 1.

The EQ part 100 corresponds to an equalization process part. The EQ part 100 conducts an equalizing process with respect to serial received data RXDT to input before binarization, and outputs serial received data EQDT being serialized. An equalization characteristic of the EQ part 100 is determined by an equalization characteristic control signal EQCNT output from the EQC 104 (corresponding to the equalization controller). As an example of the EQ part 100, a Continuous-Time Linear Equalizer (CTLE) may be used. In this case, the equalization characteristic control signal EQCNT is used as a signal to change a direct current (DC) gain of the frequency characteristic and a peaking frequency of the EQ part 100.

The CKG part 101 generates a multiphase clock CK[7:0] of eight phases each having an equidistant phase interval based on a reference clock RCK. A clock of a frequency, which is defined beforehand based on a data transmission rate, is used as the reference clock RCK.

The MS part 102 includes three binarization circuits 106a, 106b, and 106c, three oversampling circuits 103a, 103b, and 103c, and three parallelizers 108a, 108b, and 108c.

Each of the binarization circuits 106a, 106b, and 106c includes a function for switching a threshold voltage to binarize at multi-stages. In this case, a threshold voltage Q0 of the binarization circuits 106a is set to be a standard threshold voltage (for example, 50% of a power supply voltage). A threshold voltage Q1 of the binarization circuits 106b is set to be a low threshold voltage (for example, 25% of the power supply voltage). A threshold voltage Q2 of the binarization circuits 106c is set to be a high threshold voltage (for example, 75% of the power supply voltage). In the first embodiment, three threshold voltages are implemented. If a sampling device including N threshold voltages in which N is 2 or integers greater than or equal to 4), multi value data of N values may be used. In the first embodiment, a difference of 0.25×Vdd is applied among three threshold voltages Q0 to Q2. The value 0.25×Vdd is also an example and the difference is not limited to the value 0.25×Vdd.

Accordingly, the serial received data EQDT, which are equalized and input to the MS part 102, pass the binarization circuits 106a, 106b, and 106c in which different threshold voltages are set, respectively, so as to be three sets of serial data (D0, D1, and D2).

Components D0, D1, and D2 of ternary serial data are input to the oversampling circuits 103a, 103b, and 103c, respectively. Each of the oversampling circuits 103a, 103b, and 103c includes flip flops (eight flip flops F0 to F7 in this case) corresponding to an oversampling numbers. The oversampling circuits 103a, 103b, and 103c read respective data of the components D0, D1, and D2 of the ternary serial data being input at a timing of a rising edge (or a falling edge) of each of multiphase clocks [7:0], and generate ternary oversampling data.

Ternary oversampling data, which are outputs of the oversampling circuits 103a, 103b, and 103c, are input to the parallelizers 108a, 108b, and 108c. Each of the parallelizers 108a, 108b, and 108c outputs the ternary oversampling data by synchronizing with a clock in the multiphase clock.

The CDR part 105 inputs data of the multi-value oversampling data generated by the MS part 102, which are binarized by the standard threshold voltage, that is, the CDR part 105 inputs data OVS output from the parallelizer 108a. The CDR part 105 restores a symbol data CDRDT and a symbol clock CDRCK by using the oversampling data OVS. Various methods are known as a CDR method using the oversampling data, and a detailed explanation will be omitted.

The EQC 104 includes a function which generates the equalization characteristic control signal EQCNT by using multi-value oversampling data (the data OVS binarized by the standard threshold voltage, data OVSL binarized by the low threshold voltage, and data OVSH binarized by the high threshold voltage) generated by the MS part 102, and controls the equalization characteristic of the EQ part 100.

<<Operation of Equalizer Controller>>

Figure 3A:
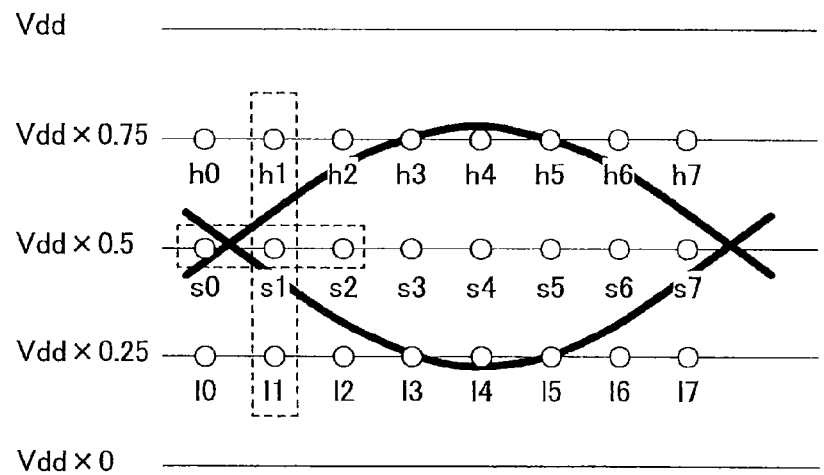
FIG. 3A, FIG. 3B, and FIG. 3C are diagrams for explaining an operation of an equalizer controller in FIG. 2 and a first detection method of an eye opening of an eye pattern.
Figure 3B:
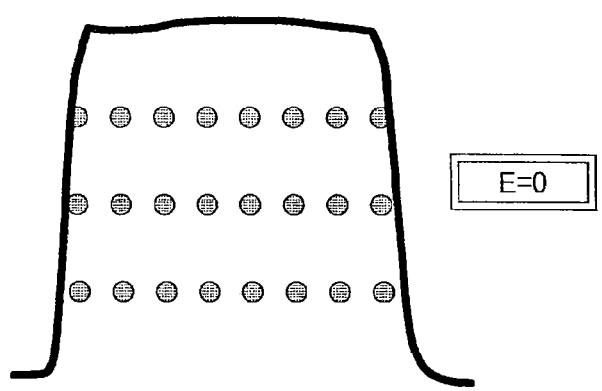
Figure 3C:
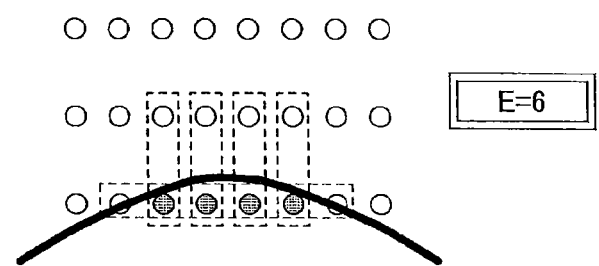

FIG. 3A, FIG. 3B, and FIG. 3C are diagrams for explaining an operation of the EQC 104 in FIG. 2 and a first detection method of an eye opening of an eye pattern. FIG. 3A depicts a location relationship (a sampling space) between the serial received data EQDT being equalized and the multi-value oversampling bits. FIG. 3B depicts a wider eye opening of the eye pattern of the serial received data EQDT being equalized, and FIG. 3C depicts a narrower eye opening of the eye pattern of the serial received data EQDT being equalized.

In general, the eye pattern is known as an index to evaluate a signal quality of transmitted and received data in a serial communication. The eye pattern is displayed by overwriting signals, so as to visually display dispersion of time transition. In a case in which there is less temporal change and dispersion in the signal transition, a portion where the signal which occupies a unit time is defined becomes large. Thus, an opening portion (the eye opening) of the eye pattern becomes large. On the other hand, in a case in which there is a greater temporal change and dispersion in the signal transition, the portion where the signal which occupies the unit time is defined becomes smaller. As described above, there is a correlation between the signal quality and the eye opening.

As illustrated in FIG. 3A, the multi-value oversampling data are formed by data s0 through s7 which are binarized by the standard threshold voltage (Vdd×0.5), data h0 through h7 binarized by the high threshold voltage (Vdd×0.75), and data l0 through l7 binarized by low threshold voltage (Vdd×0.25). Each set of the data s0 through s7, h0 through h7, and l0 through l7 is called "oversampling data" or "multiphase sampling data".

By using the multi-value oversampling data (three sets of "8-bit multiphase sampling data") of 24 bits which are input, the EQC 104 detects the eye opening in a voltage direction of the eye pattern of the serial received data EQDT being equalized and the eye opening in a time direction. Based on a detection result, the EQC 104 adjusts the equalization characteristic control signal EQCNT of the EQ part 100.

Figure 4:
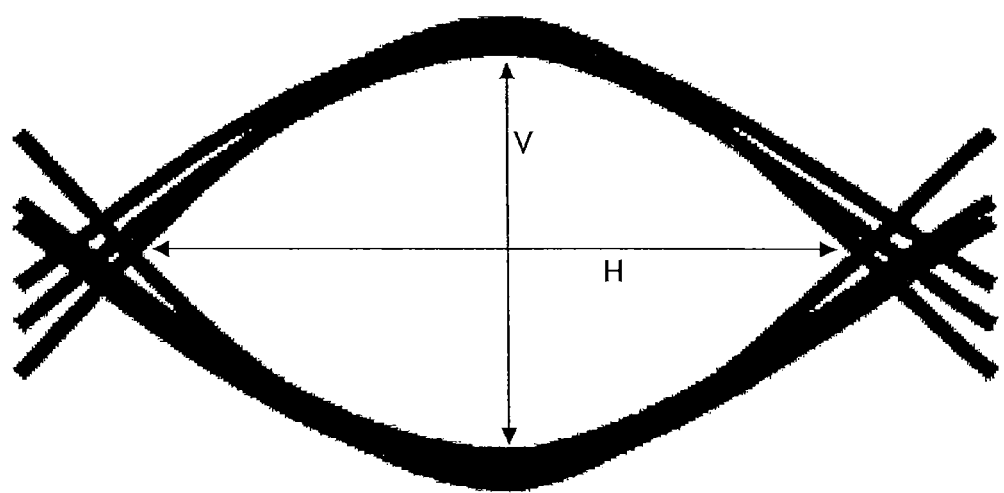
FIG. 4 is a diagram for explaining the eye pattern, the eye opening in a voltage direction, and the eye opening in a time direction.

FIG. 4 is a diagram for explaining the eye pattern, the eye opening in the voltage direction, and the eye opening in the time direction. Height of the eye opening in the voltage direction of the eye pattern is indicated by V in FIG. 4, and is generally called an "eye height" (an eye opening height). Also, Width of the eye opening in the time direction of the eye pattern is indicated by H in FIG. 4, and is generally called an "eye width" (an eye opening width).

[Detection Method of Eye Opening]

Next, a detection method of the eye opening of the eye pattern by the EQC 104 will be described in an order of a first detection method and a second detection method.

[First Detection Method]

In a sampling space of the multi-value oversampling data (h[7:0], s[7:0], and l[7:0]) being input, an Exclusive OR (XOR) with each of adjacent sets of data (up, down, right, and left data) is calculated, and a value acquired by adding all Exclusive OR results is defined as an edge count e.

The Exclusive OR indicates 1 if sets of input data, being logical operation subjects, are different data, and indicates 0 if the sets of the input data are the same data. Hence, the edge count e is regarded as data indicating whether sets of the adjacent data are the same data.

Also, the sets of the adjacent data in an up and down direction are sets of data which are sampled by a clock of the same phase in the multiphase clock CK, that is, sets of the multi-value oversampling data (hereinafter, multi-value sampling data) at the same time. The multi-value oversampling data forms a symbol. The sets of adjacent data in a right and left direction form sets of data sampled by a clock of an adjacent phase, that is, sets of the multi-value oversampling data being adjacent each other in the time direction and being binarized in the same threshold in which a symbol is formed.

For example, the edge count e (s1) of data s1 in FIG. 3A is calculated by the following expression.

$$e(s1)=(s1\,xor\,s0)+(s1\,xor\,s2)+(s1\,xor\,h1)+(s1\,xor\,l1)$$

A value acquired by aggregating the edge counts e of all sets of data indicates an edge count E of one symbol, and is described by the following expression.

$$E=\Sigma e=e(s0)+e(s1)+\ldots+e(s7)+e(h0)+\\e(h1)+\ldots+e(h7)+e(l0)+\\e(l1)+\ldots+e(l7)$$

When the eye opening height and an eye opening width of the eye pattern become greater, the edge count E is likely to be smaller. When the eye opening height and an eye opening width of the eye pattern become smaller, the edge count E is likely to be greater. Values of the edge counts E indicate 0 and 6, respectively.

By integrating the edge count E for multiple symbols, it is possible to smooth momentary fluctuation of the edge count E, and to detect an average eye opening height and an average eye opening width of the eye pattern of multiple symbols.

A required value of a system is set beforehand for an edge count integration value, and an operated count value is compared with the required value. If a measured value is greater than a value which is set beforehand, it is determined that the eye opening height and the eye opening width of the eye pattern of the serial received data EQDT which is equalized and input to the MS part 102 are smaller. Thus, an equalization amount of the EQ part 100 is raised by one stage. It can be realized that the equalization amount of the EQ part 100 is raised by setting the equalization characteristic control signal EQCNT which is output from the EQC 104 so that the equalization amount is raised by one stage. When a change of the equalization process is conducted, an integration value of the edge counts E is compared with the required value, again. It is determined whether the equalization amount is proper.

If a measured edge count integration value is smaller than the required value which is set beforehand, it is determined that the eye opening height and the eye opening width of the eye pattern of the serial received data EQDT which are equalized and input to the MS part 102. Then, it is determined that a setting value of the equalization amount of the EQ part 100 is proper. The equalization amount is defined.

In general, since the signal quality, and the eye opening height and the eye opening width of the eye pattern similarly tend to be great or small, it is preferable to detect the eye opening by a value merging both the eye opening height and the eye opening width. Alternatively, the entire eye opening may be substituted with a value acquired by detecting either one of the eye opening height or the eye opening width.

[Second Detection Method]

Figure 5A:
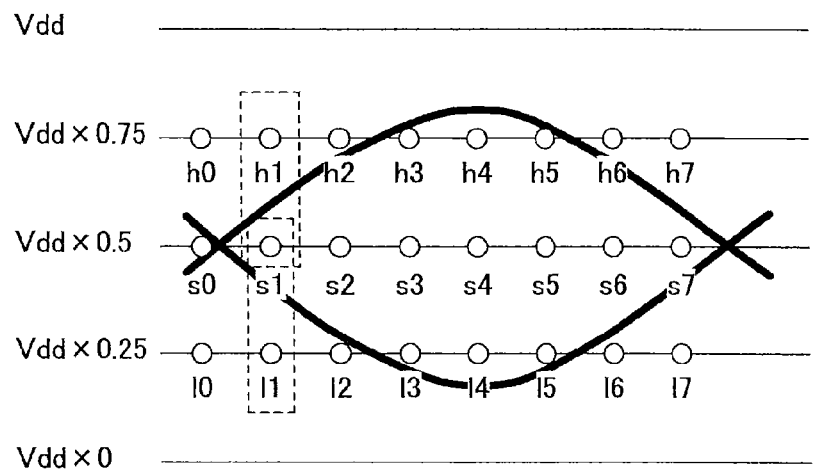
FIG. 5A, FIG. 5B, and FIG. 5C are diagrams for explaining a second detection method of the eye opening of the eye pattern.
Figure 5B:
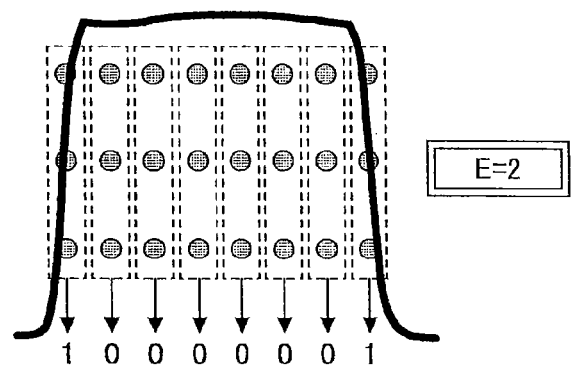
Figure 5C:
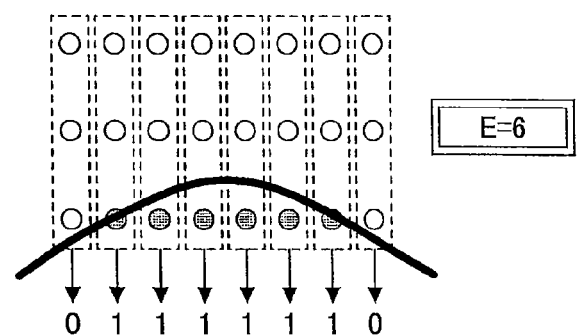

FIG. 5A, FIG. 5B, and FIG. 5C are diagrams for explaining a second detection method of the eye opening of the eye pattern. FIG. 5A illustrates the location relationship (the sampling space) between the serial received data EQDT being equalized and the multi-value oversampling bits. Also, FIG. 5B depicts a wider eye opening of the eye pattern of the serial received data EQDT being equalized, and FIG. 5C depicts a narrower eye opening of the eye pattern of the serial received data EQDT being equalized. Next, a procedure for detecting the eye opening height by another detection method other than the first detection method described above in the EQC 104 will be described with reference to FIG. 5A through FIG. 5C.

In the multi-value oversampling data (h[7:0], s[7:0], and l[7:0]) being input, the Exclusive OR is calculated for sets of data, in which threshold voltages are adjacent, in data sampled by the same clock. Values acquired by the Exclusive OR are aggregated for each of clocks.

That is, sets of the multi-value sampling data sampled by each of the clocks illustrated in FIG. 5A are acquired by the following expressions.

$$e0=h0(XOR)s0+s0(XOR)l0$$

$$e1=h1(XOR)s1+s1(XOR)l1$$

...

$$e7=h7(XOR)s7+s7(XOR)l7$$

These expressions indicate whether adjacences of the multi-value sampling data acquired by sampling with a different threshold voltage are corresponded to each other, by using the same clock. That is, these expressions indicate whether a data transition point (a data edge) exists in the same clock sampling. A value acquired by adding all e0 through e7 is defined as the edge count E. That is, the edge count $E=e0+e1+\ldots+e7$.

In a case in which the eye opening height is high (for example, FIG. 5B), the edge count E becomes smaller. The edge count E indicates 2 which is a minimum value in the example in FIG. 5B. On the other hand, in a case in which the eye opening height is low (for example, FIG. 5C), the edge count E becomes greater. In the example in FIG. 5C, the edge count E indicates 6.

By integrating the edge count E for the multiple symbols, it is possible to smooth the momentary fluctuation of the edge count e, and to detect the average eye opening height of the multiple symbols.

The required value from the system for the edge count integration value is determined beforehand, and the operated count value is compared with the required value. If the measured edge count integration value is greater than the required value which is set beforehand, it is determined that the eye opening of the serial received data EQDT which is equalized and input to the MS part 102 is small, and the equalization amount of the EQ part 100 is raised by one stage. It can be realized that the equalization amount of the EQ part 100 is raised by setting the equalization characteristic control signal EQCNT which is output from the EQC 104 so that the equalization amount is raised by one stage. When a change of the equalization process is conducted, an integration value of the edge counts e is compared with the required value, again. It is determined whether the equalization amount is proper. When the equalization process is changed, the edge counts E are integrated and the integration value is compared with the required value, again. Then, it is determined whether the equalization amount is proper.

If the measured edge count integration value is smaller than the required value which is set beforehand, it is determined that the eye opening of the serial received data EQDT which is equalized and input to the MS part 102 is great. Hence, it is determined that the setting value of the equalization amount of the EQ part 100 is proper, and the equalization amount is defined.

Figure 6:
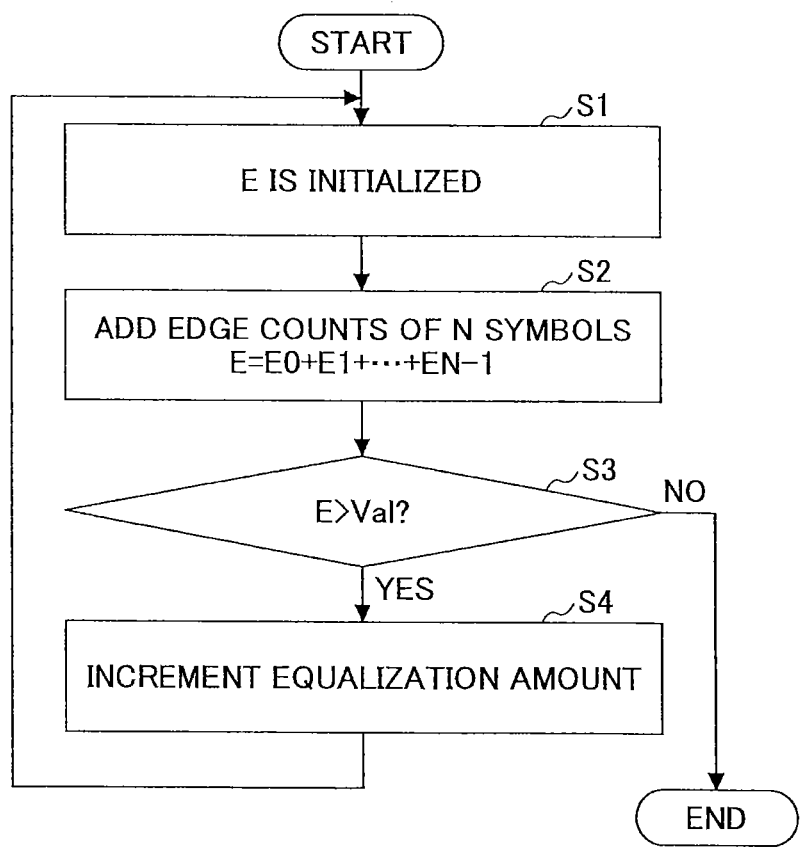
FIG. 6 is a flowchart for explaining a process for determining an equalization characteristic control signal in the equalization controller in FIG. 2.

FIG. 6 is a flowchart for explaining a process for determining the equalization characteristic control signal EQCNT of the EQ part 100 in the EQC 104. In this case, the eye opening is detected by either one of the above described two methods.

First, a count value (the edge count E) of an internal edge counter is initialized to 0 (zero) (step S1).

Next, the edge count E is calculated by using the multi-value oversampling data (OVS, OVSL, and OVSH). Calculation of the edge count E is successively conducted for N symbols of a receive signal, and edge count results are integrated. Accordingly, the edge count E is expressed as follows (step S2).

$$E=E0+E1+\ldots+EN-1$$

Next, it is determined whether an integration value of the edge count E exceeds a threshold value (Val) which is set to the system beforehand (step S3). As a result of the determination, when the integration value exceeds the threshold value (Val) (YES in step S3), the EQC 104 outputs the equalization characteristic control signal EQCNT which increments the equalization amount of the EQ part 100 (step S4). After that, the process goes back to step S1. As the result of the determination, when the integration value does not exceed the threshold value (Val) (NO in step S3), the process is terminated.

When the process is terminated, the equalization characteristic control signal EQCNT is output to the EQ part 100 to perform equalization so that the eye opening of the eye pattern of the serial received data EQDT which is equalized and is input to the MS part 102 becomes greater than the eye opening which is set beforehand in the system.

According to the data receiver 10 in the first embodiment, by implementing the oversampling type CDR circuit, the adaptive equalizing can be realized with respect to the serial received data to which the binarization is not conducted.

Also, by averaging the edge count E of the multi-value sampling data of one symbol for the multiple symbols, it is possible to eliminate influence of the momentary fluctuation of the edge count E, and to improve a detection accuracy of the eye opening.

Second Embodiment

Configuration of Data Receiver

Figure 7:
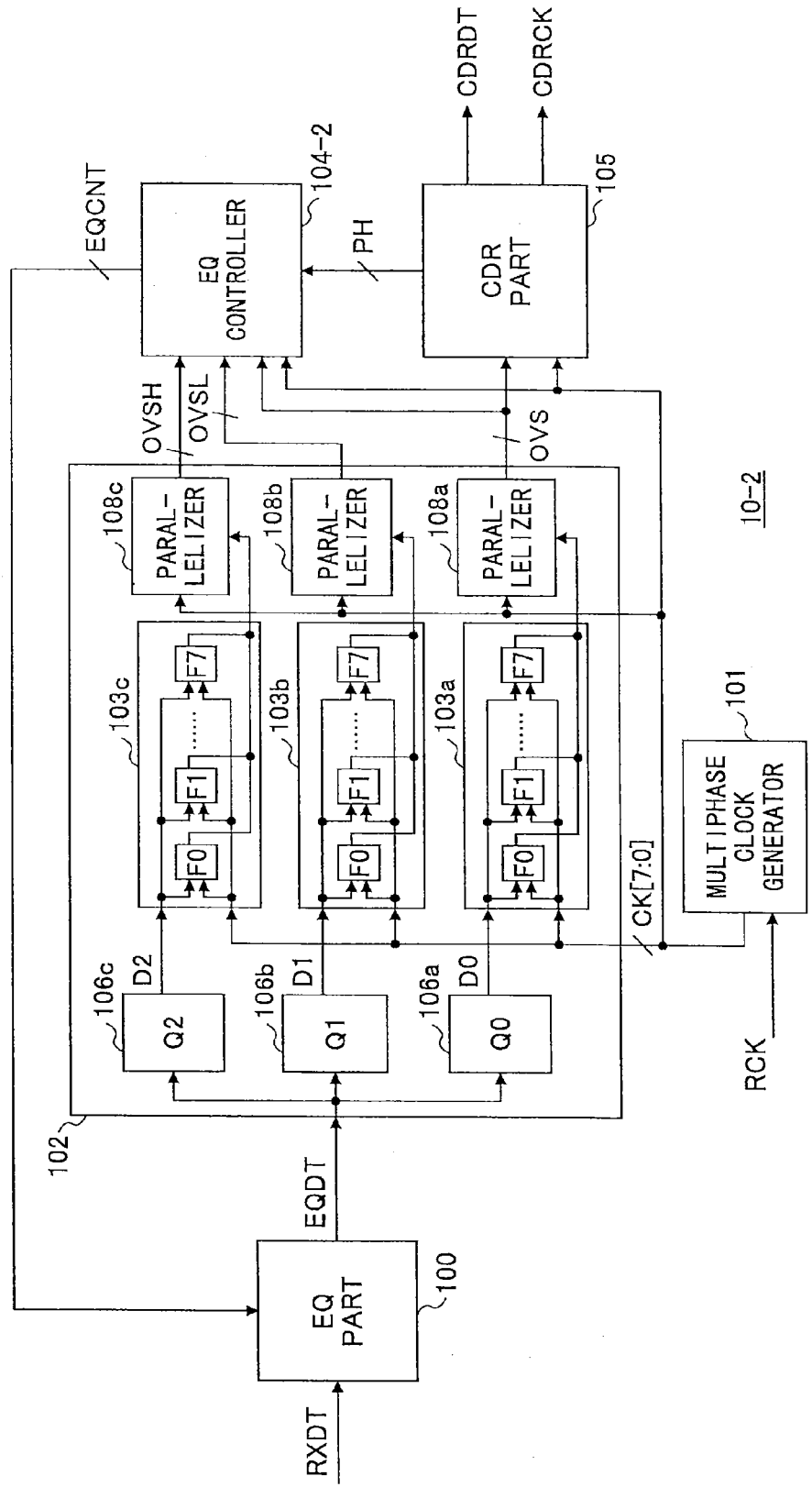
FIG. 7 is a block diagram of a data receiver in a data communication system according to a second embodiment.

FIG. 7 is a block diagram of a data receiver 10-2 in a data communication system according to a second embodiment. In FIG. 7, devices that are the same as or correspond to those in FIG. 2 are indicated by the same reference numerals. Also, a brief block diagram of the data communication system in the second embodiment is the same as that in the first embodiment (FIG. 1).

As apparently seen from a comparison between the diagrams of FIG. 7 and FIG. 2, since the data receiver 10-2 according to the second embodiment includes common portions to the data receiver 10 according to the first embodiment, different portions are mainly explained to avoid duplicated explanation.

In the data receiver 10-2 according to the second embodiment, the CDR part 105 outputs phase information of the oversampling data applied to restore the symbol data CDRDT and the symbol clock CDRCK as a phase selection signal PH to an EQC 104-2. The phase information is regarded as phase information of a recovery clock extracted from the oversampling data OVS which is binarized by the standard threshold voltage. Based on information of the phase selection signal PH, it is possible for the EQC 104-2 to know a phase which the CDR part 105 restores as data. It is possible to detect the eye opening of the eye pattern by a method convenient more than the first embodiment. Details will be described later.

<<Operation of Equalizer Controller>>

Figure 8A:
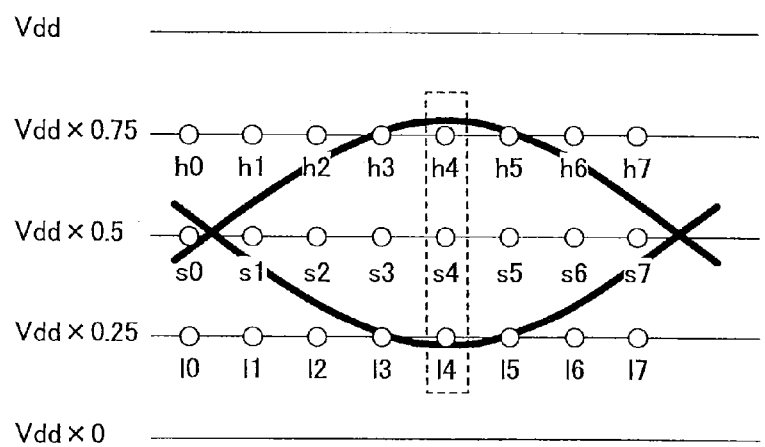
FIG. 8A and FIG. 8B are diagrams for explaining an operation of the equalization controller.
Figure 8B:
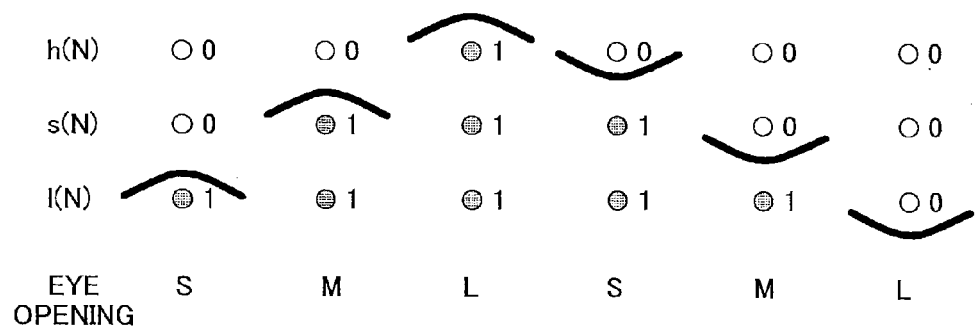

FIG. 8A and FIG. 8B are diagrams for explaining an operation of the EQC 104-2. FIG. 8A is a diagram illustrating the location relationship (the sampling space) between the serial received data EQDT being equalized and the multi-value oversampling bits. Also, FIG. 8B is a diagram illustrating the sampling data and a detection result of the eye opening height.

As illustrated in FIG. 8A, the multi-value oversampling data are formed by data s0 through s7 which are binarized by the standard threshold voltage (Vdd×0.5), data h0 through h7 binarized by the high threshold voltage (Vdd×0.75), and data l0 through l7 binarized by low threshold voltage (Vdd×0.25). In the second embodiment, three threshold voltages are implemented. If a sampling device including N threshold voltages in which N is 2 or integers greater than or equal to 4), multi-value data of N values may be used. In the second embodiment, a difference of 0.25×Vdd is applied among three threshold voltages Q0 to Q2. The value 0.25×Vdd is also an example and the difference is not limited to the value 0.25×Vdd.

In the EQC 104-2, the phase selection signal PH is input from the CDR part 105, and an oversampling phase (a CDR phase) to restore by the CDR part 105 can be determined. Accordingly, the eye opening height of the eye pattern is detected by using the multi-value sampling data of the CDR phase, that is, the oversampling data of the same timing (time) as the CDR phase, and the equalization characteristic control signal EQCNT of the EQ part 100 is adjusted.

The detection method of the eye opening height will be described. It is assumed that the CDR phase is a fourth phase. Sets of the sampling data sampled by the CDR phase are l4, s4, and h4, respectively.

It is possible to acquire the eye opening height of the eye pattern from the sampling data. As depicted in FIG. 8A, since the CDR phase is positioned approximately at the center of the symbol data, if all sets of muti-value sampling data l4, s4, and h4, which are binarized by the threshold voltages of 25%, 50%, and 75% of the power supply voltage Vdd in the CDR phase, correspond to each other, it is determined that the eye opening height of the eye pattern is assured. If all sets of muti-value sampling data l4, s4, and h4 do not correspond to each other, it is determined that the eye opening height of the eye pattern is not assured. In order to detect a data correspondence, edge detection is conducted for sets of adjacent data. A fact in that a data edge does not exist between the sets of the adjacent data is considered as a judging standard.

Accordingly, by calculating the Exclusive OR (XOR) of the adjacent data of the multi-value sampling data l4, s4, and h4, and adding XOR results, it is possible to acquire the eye opening height of the eye pattern. That is, "l4(XOR)s4+s4 (XOR)h4" is calculated. If this calculation result indicates 1, it is determined that the eye opening of the eye pattern is assured, and a process to raise the equalization amount of the EQ part 100.

Figure 9:
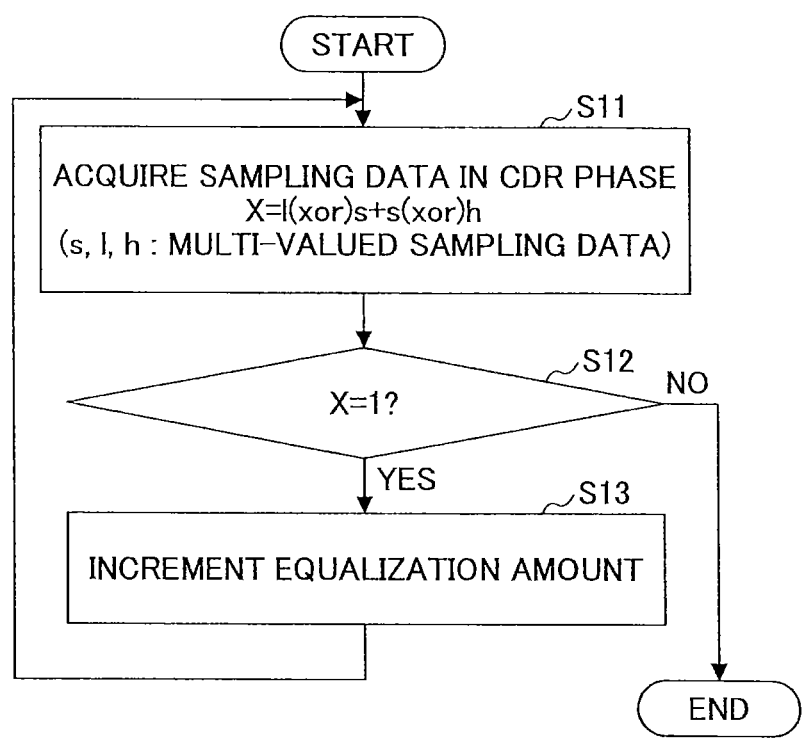
FIG. 9 is a flowchart for explaining a process for determining the equalization characteristic control signal in the equalization controller.

FIG. 9 is a flowchart for explaining a process for determining the equalization characteristic control signal EQCNT of the EQ part 100 in the EQC 104-2.

First, sets of the multi-value sampling data s, l, and h in the CDR phase are acquired (step S11). The sets of the multi-value sampling data s, l, and h correspond to data which are acquired by sampling sets of ternary serial data D0, D1, and D2 being binarized based on the threshold voltages of 25%, 50%, and 75% of the power supply voltage Vdd, respectively, with the oversampling clock having the same phase as the CDR phase. Data edges are calculated with respect to the sets of the multi-value sampling data s, l, and h. The data edge is calculated by adding all results from the Exclusive OR of the adjacent data. A determination result is set as a variable X, that is, "X=l(XOR)s+s(XOR)h".

Next, it is determined whether a data edge determination result X indicates 1 (step S12). As a result, a logical product X indicates 1 (YES in step S12), the EQC 104-2 outputs the equalization characteristic control signal EQCNT for incrementing the equalization amount of the EQ part 100 (step S13). After that, the process goes back to step S11. As a determination result, when the logical production X does not indicate 1, that is, the logical production X indicates 0 (NO in step S12), it is determined that the eye opening height of the eye pattern is assured and the process is terminated.

In the second embodiment, since the CDR phase is assured by the CDR part 105, the eye opening width is not required to detect. Accordingly, the detection method of the eye opening in the second embodiment is more simplified than the first embodiment.

According to the above described embodiments, the data receivers 10 and 10-2 including the oversampling type CDR circuit can realize an adaptive equalizing with respect to serial received data before the binarizaion.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.)

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus. The present application is based on Japanese Priority Patent Applications No. 2012-110860 filed on May 14, 2012 and No. 2013-051442 filed on Mar. 14, 2013, the entire contents of which are hereby incorporated by reference.

What is claimed is:

1. A data receiver, comprising:
    an equalization process part configured to equalize serial received data before binarization and to output the serial received data being equalized;
    a multi-value oversampling part configured to binarize the serial received data being equalized by multiple threshold values, to conduct oversampling, and to generate multi-value sampling data; and
    an equalization controller configured to detect an eye pattern of the serial received data being equalized based on the multi-value oversampling data, and to control an equalization characteristic of the equalization process part based on a detection result, wherein the equalization controller is configured to:

detect the eye pattern based on the multi-value sampling data, which are sampled with a same clock, in data acquired by conducting a multi-value oversampling for a set of symbol data;

calculate an Exclusive OR for sets of adjacent data of the multi-value sampling data, which are sampled with the same clock, in data in which the set of the symbol data is acquired by the multi-value oversampling;

add calculation results of the Exclusive OR corresponding to the sets of the adjacent data for each of phase clocks; and detect the eye pattern based on the addition results.

2. The data receiver as claimed in claim 1, wherein the equalization controller is configured to:

perform a first calculation for calculating an Exclusive OR for sets of adjacent data of the multi-value sampling data, which are sampled with the same clock, in data in which the set of the symbol data is acquired by the multi-value oversampling;

perform a second calculation for adding first calculation results of the Exclusive OR corresponding to the sets of the adjacent data for each of phase clocks; and detect the eye pattern based on results from performing the first calculation and the second calculation for each of multiple sets of symbol data.

3. A data receiver, comprising:

an equalization process part configured to equalize serial received data before binarization and to output the serial received data being equalized;

a multi-value oversampling part configured to binarize the serial received data being equalized by multiple threshold values, to conduct oversampling, and to generate multi-value sampling data; and an equalization controller configured to detect an eye pattern of the serial received data being equalized based on the multi-value oversampling data, and to control an equalization characteristic of the equalization process part based on a detection result, wherein the equalization controller is configured to:

detect the eye pattern based on the multi-value sampling data, which are sampled by a same clock and multi-phase sampling data which are binarized by a same threshold voltage, in data in which the set of the symbol data is acquired by multi-value oversampling, perform a first calculation in which an Exclusive OR is calculated for the multi-value sampling data, sampled with the same clock and each of sets of adjacent data, and add first results of the Exclusive OR corresponding to the sets of the adjacent data for each of phase clocks;

perform a second calculation in which the Exclusive OR is calculated for sets of adjacent data of the multi-phase sampling data binarized by the same threshold voltage, and add second results of the Exclusive OR corresponding to the sets of the adjacent data for each of threshold voltages, in the data in which the set of the symbol data is acquired by the multi-value oversampling; and detect the eye pattern based on a first calculation result from performing the first calculation and a second calculation result from performing the second calculation.

4. The data receiver as claimed in claim 3, wherein the equalization controller is configured to:

perform a first calculation in which an Exclusive OR is calculated for the multi-value sampling data sampled with the same clock and each of sets of adjacent data, and add first results of the Exclusive OR corresponding to the sets of the adjacent data for each of phase clocks;

perform a second calculation in which the Exclusive OR is calculated for sets of adjacent data of the multi-phase sampling data binarized by the same threshold voltage, and add second results of the Exclusive OR corresponding to the sets of the adjacent data for each of threshold voltages, in the data in which the set of the symbol data is acquired by the multi-value oversampling; and detect the eye pattern based on an average of calculation results from performing the first calculation and the second calculation for multiple sets of symbol data.

5. The data receiver as claimed in claim 4, wherein the equalization controller is configured to detect the eye pattern based on the multi-value sampling data sampled by the same clock as a recovery clock in the data in which the set of the symbol data is acquired by the multi-value oversampling, by using phase information of the recovery clock extracted from the multi-value oversampling data.

6. The data receiver as claimed in claim 5, wherein the equalization controller is configured to:

calculate an Exclusive OR for sets of adjacent data of the multi-value sampling data, which are sampled with the recovery clock, in the data in which the set of the symbol data is acquired by the multi-value oversampling, by using the phase information of the recovery clock extracted from the multi-value oversampling data;

add calculation results of the Exclusive OR corresponding to the sets of the adjacent data; and detect the eye pattern based on an addition result.

7. The data receiver as claimed in claim 6, wherein the equalization controller is configured to:

calculate the Exclusive OR of the sets of adjacent data of the multi-value sampling data sampled by the recovery clock in the data in which the set of the symbol data is acquired by the multi-value oversampling, by using the phase information of the recovery clock extracted from the multi-value oversampling data;

add calculation results corresponding to the sets of the adjacent data for each of the multiple sets of symbol data; and detect the eye pattern based on an average of addition results.

8. A data communication method performed in a data communication system including a data receiver and a data transmitter configured to transmit serial data to the data receiver, wherein the data receiver performs:

equalizing serial received data before binarization and to output the serial received data being equalized;

binarizing the serial received data being equalized by multiple threshold values, to conduct oversampling, and to generate multi-value sampling data; and detecting an eye pattern of the serial received data being equalized based on the multi-value oversampling data, and to control an equalization characteristic based on a detection result, wherein the detecting of the eye pattern, and the control of the equalization characteristic comprises:

detecting the eye pattern based on the multi-value sampling data, which are sampled with a same clock, in data acquired by conducting a multi-value oversampling for a set of symbol data;

calculating an Exclusive OR for sets of adjacent data of the multi-value sampling data, which are sampled with the same clock, in data in which the set of the symbol data is acquired by the multi-value oversampling;

adding calculation results of the Exclusive OR corresponding to the sets of the adjacent data for each of phase clocks; and detecting the eye pattern based on the addition results.

* * * * *